United States Patent
Anderson et al.

(10) Patent No.: US 10,789,826 B2
(45) Date of Patent: Sep. 29, 2020

(54) REAL-TIME SAFETY DETECTION AND ALERTING

(71) Applicant: INTERNATIONAL BUSINESS MACHINES CORPORATION, Armonk, NY (US)

(72) Inventors: Evelyn R. Anderson, Houston, TX (US); Martin G. Keen, Cary, NC (US); Natalie Brooks Powell, Bolingbrook, IL (US); Michael Boone, Lutz, FL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/158,624

(22) Filed: Oct. 12, 2018

(65) Prior Publication Data
US 2020/0118412 A1  Apr. 16, 2020

(51) Int. Cl.
*G08B 23/00* (2006.01)
*G08B 21/08* (2006.01)
(Continued)

(52) U.S. Cl.
CPC ....... *G08B 21/086* (2013.01); *G06K 9/00369* (2013.01); *G08B 21/22* (2013.01);
(Continued)

(58) Field of Classification Search
CPC .. G08B 21/086; G08B 21/22; G06K 9/00369; G10L 15/22; G10L 2015/227; G10L 2015/228; H04W 4/023
See application file for complete search history.

(56) References Cited

U.S. PATENT DOCUMENTS 5,043,705 A * 8/1991 Rooz ................. G08B 13/1609
340/552
5,307,763 A * 5/1994 Arthur ................ A01K 15/023
119/718

(Continued)

FOREIGN PATENT DOCUMENTS

CN      102005103 A      4/2011

OTHER PUBLICATIONS

"Unintentional Drowning: Get the Facts", Centers for Disease Control and Prevention, Apr. 28, 2016, 2 pgs. Retrieved on Sep. 7, 2018 from the Internet URL: <https://www.cdc.gov/homeandrecreationalsafety/water-safety/waterinjuries-factsheet.html>.

(Continued)

*Primary Examiner* — Quang Pham
(74) *Attorney, Agent, or Firm* — Brian Restauro; Matthew M. Hulihan; Heslin Rothenberg Farley & Mesiti PC (57) ABSTRACT

Real-time detection and alerting for swimming pool safety includes obtaining signals from sensor devices installed in a swimming pool area having a swimming pool, ascertaining, based on the obtained signals, that an individual has entered the swimming pool and identifying, based on the obtained signals, characteristics of the individual who has entered the swimming pool, determining whether to raise an alert about the individual having entered the swimming pool, the determining being based at least in part on location of one or more other individuals relative to the swimming pool area and on checking pre-configured parameters for alerting, and performing processing based on the determining whether to raise an alert.

20 Claims, 6 Drawing Sheets

(51) Int. Cl.
*H04W 4/02* (2018.01)
*G08B 21/22* (2006.01)
*G10L 15/22* (2006.01)
*G06K 9/00* (2006.01)

(52) U.S. Cl.
CPC .............. *G10L 15/22* (2013.01); *H04W 4/023* (2013.01); *G10L 2015/227* (2013.01); *G10L 2015/228* (2013.01)

(56) References Cited

U.S. PATENT DOCUMENTS

| | | | | |
|---|---|---|---|---|
| 5,448,936 A * | 9/1995 | Turner | B63G 7/02 | 89/1.13 |
| 5,486,814 A * | 1/1996 | Quinones | G08B 21/088 | 340/569 |
| 5,638,048 A * | 6/1997 | Curry | G01S 13/56 | 340/522 |
| 5,801,625 A * | 9/1998 | Wang | G08B 25/008 | 340/5.28 |
| 5,886,630 A * | 3/1999 | Menoud | G08B 21/082 | 340/540 |
| 5,953,439 A * | 9/1999 | Ishihara | G06T 7/254 | 382/107 |
| 5,959,534 A * | 9/1999 | Campbell | G08B 21/082 | 340/553 |
| 6,133,838 A * | 10/2000 | Meniere | G08B 21/082 | 340/566 |
| 6,157,304 A * | 12/2000 | Bennett | G08B 21/082 | 340/522 |
| 6,249,225 B1 * | 6/2001 | Wang | G08B 25/008 | 340/330 |
| 6,327,220 B1 * | 12/2001 | Miller, Jr. | H04B 11/00 | 367/134 |
| 6,384,726 B1 * | 5/2002 | Epple | E04H 4/101 | 340/545.6 |
| 7,160,166 B2 * | 1/2007 | Humphreys | B63B 22/00 | 4/504 |
| 7,330,123 B1 * | 2/2008 | Grahn | G08B 21/082 | 340/553 |
| 7,554,453 B2 * | 6/2009 | Snyder | G08B 21/088 | 340/309.16 |
| 10,102,731 B1 * | 10/2018 | Aronchick | G08B 21/086 | |
| 2001/0048365 A1 * | 12/2001 | McFarand | G08B 21/082 | 340/573.6 |
| 2003/0222782 A1 * | 12/2003 | Gaudreau | G08B 21/082 | 340/573.6 |
| 2006/0187831 A1 * | 8/2006 | Justen | G08B 25/009 | 370/229 |
| 2007/0132578 A1 * | 6/2007 | Powell | G08B 21/023 | 340/539.26 |
| 2007/0273765 A1 * | 11/2007 | Wang | G06K 9/38 | 348/152 |
| 2008/0048870 A1 * | 2/2008 | Laitta | G08B 25/08 | 340/573.6 |
| 2009/0255049 A1 * | 10/2009 | Rosenau | A61H 33/02 | 4/584 |
| 2009/0295566 A1 * | 12/2009 | Weintraub | G08B 21/088 | 340/539.11 |
| 2009/0303055 A1 * | 12/2009 | Anderson | G08B 21/086 | 340/573.6 |
| 2010/0002222 A1 * | 1/2010 | Lubard | G01S 7/497 | 356/4.01 |
| 2010/0026488 A1 * | 2/2010 | Sullivan | G08B 21/086 | 340/550 |
| 2010/0176956 A1 * | 7/2010 | Moerschell | E04H 4/06 | 340/573.6 |
| 2010/0186159 A1 * | 7/2010 | Dalickas | E04H 4/06 | 4/504 |
| 2013/0060390 A1 * | 3/2013 | Sogo | G05B 15/02 | 700/286 |
| 2015/0016882 A1 * | 1/2015 | Oakes | G05B 19/0428 | 404/6 |
| 2016/0012700 A1 * | 1/2016 | Matko | G08B 21/086 | 340/573.6 |
| 2016/0037138 A1 * | 2/2016 | Udler | G06K 9/00771 | 348/143 |
| 2016/0239795 A1 * | 8/2016 | Burch, V | G06Q 50/28 | |
| 2016/0314675 A1 * | 10/2016 | Hawsah | G08B 21/088 | |
| 2017/0279628 A1 * | 9/2017 | Takahashi | H04L 12/403 | |
| 2017/0294094 A1 * | 10/2017 | Watkins | G01S 7/003 | |
| 2018/0040223 A1 * | 2/2018 | Bodi | G08B 21/086 | |
| 2018/0240322 A1 * | 8/2018 | Potucek | E04H 4/14 | |
| 2018/0342139 A1 * | 11/2018 | Otavio | H04M 1/27457 | |
| 2019/0010062 A1 * | 1/2019 | Beech | A46B 15/0038 | |

OTHER PUBLICATIONS

Mell, Peter, et al., "The NIST Definition of Cloud Computing", NIST Special Publication 800-145, Sep. 2011, Gaithersburg, MD, 7 pgs.

* cited by examiner

REAL-TIME SAFETY DETECTION AND ALERTING

BACKGROUND

Serious safety concerns apply to various types of physical areas that may be accessible to individuals, permissively or otherwise. Example such physical areas include swimming pools, construction sites, mines, areas undergoing maintenance, and law enforcement or military training areas, among many others. Serious injury can result if proper precautions and oversight are not observed. This is particularly the case in situations where access is possible by young children and other individuals who may be unable to handle the dangerous conditions presented.

SUMMARY

Shortcomings of the prior art are overcome and additional advantages are provided through the provision of a computer-implemented method. The method obtains signals from sensor devices installed in a swimming pool area. The swimming pool area includes a swimming pool. The method ascertains, based on the obtained signals, that an individual has entered the swimming pool, and identifies, based on the obtained signals, characteristics of the individual who has entered the swimming pool. The method determines whether to raise an alert about the individual having entered the swimming pool. The determining is based at least in part on location of one or more other individuals relative to the swimming pool area and on checking pre-configured parameters for alerting. The method then performs processing based on the determining whether to raise an alert.

Further, a computer system is provided that includes a memory and a processor in communication with the memory, and the computer system is configured to perform a method. The method obtains signals from sensor devices installed in a swimming pool area. The swimming pool area includes a swimming pool. The method ascertains, based on the obtained signals, that an individual has entered the swimming pool, and identifies, based on the obtained signals, characteristics of the individual who has entered the swimming pool. The method determines whether to raise an alert about the individual having entered the swimming pool. The determining is based at least in part on location of one or more other individuals relative to the swimming pool area and on checking pre-configured parameters for alerting. The method then performs processing based on the determining whether to raise an alert.

Yet further, a computer program product including a computer readable storage medium readable by a processing circuit and storing instructions for execution by the processing circuit is provided for performing a method. The method obtains signals from sensor devices installed in a swimming pool area. The swimming pool area includes a swimming pool. The method ascertains, based on the obtained signals, that an individual has entered the swimming pool, and identifies, based on the obtained signals, characteristics of the individual who has entered the swimming pool. The method determines whether to raise an alert about the individual having entered the swimming pool. The determining is based at least in part on location of one or more other individuals relative to the swimming pool area and on checking pre-configured parameters for alerting. The method then performs processing based on the determining whether to raise an alert.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

DETAILED DESCRIPTION

Described herein are approaches for detecting the presence of individuals in physical areas deemed to present safety concerns and issuing notifications and alerts (also referred to herein as "alarms") in instances when criteria are met. Alerts may be delivered, as one example, based on the individual being unsupervised. Aspects can use 'Internet-of-Things' (IoT)-connected sensors to ascertain who is near and/or in the physical area and, in the case of, e.g., an unsupervised child or an unaccompanied person detected to be experiencing physical difficulties and/or exposing themselves or others to risk, raise an alarm. More generally, aspects can determine when someone has entered a dangerous physical area, or is in the proximity of the physical area and/or facilities (structures, equipment, etc.) thereof, where the individual's presence is deemed sufficiently risky such that appropriate alert(s) are to be raised.

Particular examples are described herein with reference to swimming pools as the subject physical areas, though it is appreciated that aspects described herein have a broader applicability to any other type of physical area desired. Swimming pools are a common recreational and fitness-purposed item, but they can present serious safety concerns because of the potential for serious injury and drowning, particularly when young children and individuals with physical conditions that render them unable to swim can access a swimming pool area. Aspects can detect presence of individuals in a swimming pool and/or swimming pool area and issue notifications and alerts in instances when criteria are met, for instance when the individual's presence in the pool or pool area is deemed sufficiently risky such that appropriate alert(s) are to be raised. IoT-connected sensors can be used to ascertain who is near and/or in a pool and, in the case of, e.g., an unsupervised child or an unaccompanied person detected to be drowning, raise an alarm. Additionally or alternatively, a determination can be made as to when someone has entered a swimming pool, or is in the proximity of a swimming pool or other aquatic facility, and alert(s) raised based on that determination.

In a particular example, a system integrates technology to detect potential drowning through, e.g., sonar-based object detection, imaging of terrain, and/or GPS signaling of parent/custodian locations, as examples, and takes actions to alert configured sources, such as home security and other computer systems, via text, phone, voice, sound, visual, or other forms of alert in an effort to prevent possible injuries. Additionally or alternatively, aspects can use location detection to ascertain whether sufficient supervision is present and reduce the chance of false notifications/alarms in situations that do not warrant them.

Figure 1:
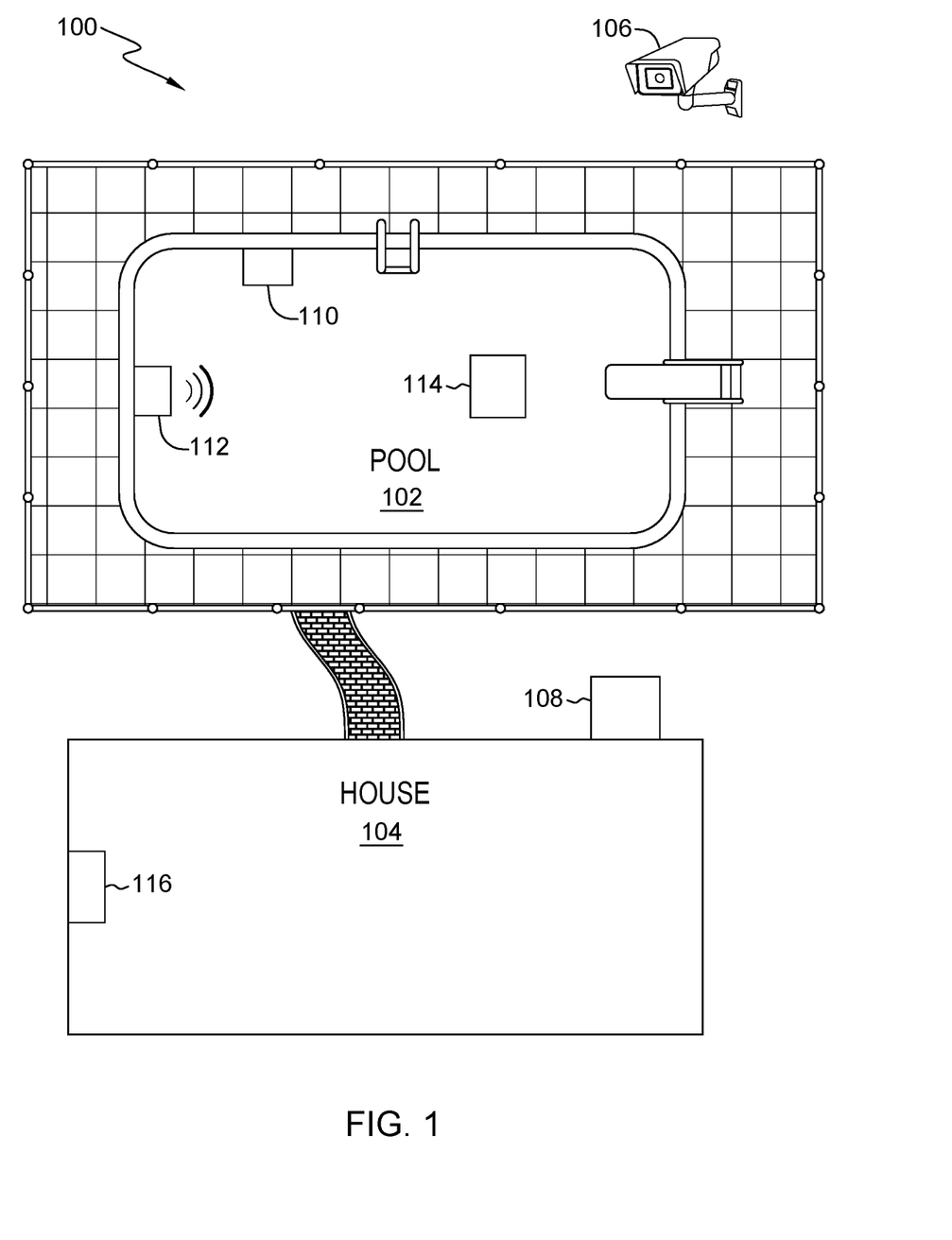
FIG. 1 depicts an example environment to incorporate and use aspects described herein.

FIG. 1 depicts an example environment to incorporate and use aspects described herein. Environment 100 includes a swimming pool area, for example environment 100 with a fenced-in swimming pool 102, situated behind a house 104. Various devices/components are also included in or proximate to the swimming pool area, including video camera(s) 106, passive listening device(s) 108, such as smart speakers with digital assistant functionality, volume and/or weight sensor(s) 110, sonar-based object detection device(s) 112, pool floor mat sensor(s) 114, and a home security system 116 in this example.

Volume/weight sensors 110 can include a scale and/or other device(s) that measure the volume of water within the pool, changes in pool water volume, and/or weight of objects or weight changes within the pool. These data points can inform whether an object, such as an individual or other object, has entered the pool, and, if so, the volume of that object.

Cameras 106 can capture images of the swimming pool area, the terrain immediately around the swimming pool, and individuals and other objects in the area. These images can feed image and feature detection processes. Image feature detection can inform about occurrences and objects proximate and in the pool. In some examples, the images are checked to verify whether a propose alert should be raised. By way of example, it may be detected that a small object, such as one the size of a toddler child, has entered the pool. This may warrant an alert, but images of the area may reveal that it was a toy that rolled into the pool, and therefore no alert should be raised.

Sonar-based object detection devices 112 perform underwater object detection and tracking, for instance based on multi-beam sonar image processing based on emission of an acoustic signal or pulse.

Passive listening audio systems 108 can be used to detect the presence of voices and, in some cases, derive identity of individuals through voice recognition.

Floor mat sensors 114 detect the presence of weight on the pool floor. The size of an individual may be ascertainable based on sensed weight. In some examples, it might sense that an adult (or any size individual) has remained on the bottom of pool but no other adult is also in the pool area. This may indicate an emergency situation. In another example, the floor mat senses someone on the bottom of the pool but the system also senses multiple other individuals in and/or around the pool who are behaving casually. This may indicate that there is no emergency, and the individual on the bottom of the pool is not in danger, for instance because he or she is practicing with a diving tank or other breathing apparatus (which may be corroborated by images from the camera(s)).

Home security systems typically include a control panel and sensors to supporting interior and exterior monitoring. The home security system 116 may be leveraged as part of alerting that takes place when it is determined to raise an alarm. For instance, raising an alert can include signaling the home alarm system proximate the swimming pool area to set off a home alarm, the home alarm including an audible alarm/alert and/or by dialing the professional monitoring service for emergency personnel dispatch.

Also included in and/or leveraged by the system may be global positioning satellite (GPS) devices that can establish location of individuals, such as individuals in the pool or around the pool area, and any individuals responsible for others. Example individuals whose location may be relevant as described herein include children, parents, babysitters, nannies, commercial service providers like pool maintenance, lawn maintenance, and other service individuals.

It is noted that FIG. 1 is just one example environment to incorporate and use aspects described herein. Other example environments to incorporate and use aspects described herein can include additional, fewer, and/or different components than those included in the example of FIG. 1. It is also noted that components of FIG. 1 may communicate with computer system(s) (not pictured) that execute software to perform processes, methods and other aspects described herein. References herein to a "system" may refer to such computer system(s) together with sensors and other devices in the environment.

In one particular example, the environment is or includes an Internet-of-Things (IoT) environment. By way of introduction, IoT refers to a network of physical computing devices, some of which may be embedded in other objects like sensing devices, appliances, mobile devices, and others, having network connectivity and enabling the devices to collect and exchange data. An IoT network can include one or more IoT devices or "smart devices", that are physical network-enabled objects. Further example objects include the sensors/devices disclosed above with reference to FIG. 1, thermostats, sensor based devices, smoke alarms, lights, home appliances, audio systems, mobile devices, televisions, security cameras, security sensors and systems, and heating, ventilation, and air conditioning (HVAC) zones, among countless other examples. Many of these objects are devices that are independently operable, but they may also be paired with a control system or alternatively a distributed control system such as one running over a cloud computing environment. The network of physical objects can be embedded with electronics, sensors, software, and connectivity to enable the exchange of data with other connected devices over a data communication infrastructure, typically according to some standard or specification.

In many cases, IoT devices are not associated with any particular user. They instead represent a physical object and monitor its behavior, such as using embedded sensors and electronics. IoT allows objects to be sensed and controlled remotely across existing network infrastructure, creating opportunities for direct integration of the physical world into computer-based systems, and resulting in improved efficiency, accuracy, and economic benefit.

In some examples, IoT devices may be used to monitor and control the mechanical, electrical, and electronic systems used in various types of commercial and residential buildings. For example, IoT devices may be used to monitor and control the lighting, heating, ventilation, air conditioning, home appliances, communication systems, entertainment, and home security devices in a home to improve convenience, comfort, energy efficiency, and security, as examples.

Aspects described herein provide, e.g., systems and methods that leverage sensors and other devices to perform real-time monitoring for alerting homeowners, pool facility owners, and emergency services when objects of given characteristics (e.g. size, weight, age, etc.) breach a swimming pool area and/or enter a swimming pool in what is contextually considered to be a potentially dangerous situation. This can be used to prevent potential drownings, for instance. The configuration of the system may be enabled/disabled based on configured parameters and thresholds.

One example of configured parameters is a configuration based on schedules, such as days and/or times. The schedule may indicate that 'when the pool is open from 9:00 AM to 6:00 PM, Monday through Saturday, alerting is Disabled' and 'when the pool is closed (outside of those hours), then the alerting is Enabled'. In this regard, a day and time schedule may be configured to indicate when the swimming pool is deemed unusable. A determination can be made based on the schedule as to whether to raise the alert, for example if an individual is determined to have entered the pool when it is closed. The alert can be raised based on at least checking the pre-configured parameters and identifying, based on a current date and time and on a weekly date and time schedule, that the swimming pool is unusable. A pool may be deemed unusable when, for example, it is indicated as closed, and/or during other timeframes, such during scheduled maintenance. In some examples, the swimming pool is a public swimming pool and the weekly date and time schedule when the swimming pool is deemed unusable includes the dates and times when the swimming pool is closed to the public. Additionally or alternatively, the schedule may be a calendar-based schedule indicating holiday or seasonal-based availability of the swimming pool, and the determination as to whether to raise the alert can be based on identifying that a current day is a holiday or is off-season.

Another example of configured parameters is a configuration based on GPS location(s) of responsible individual(s), such as adult parents, guardians, or babysitters. As explained in further detail herein, when an individual is identified as having entered a swimming pool area and/or entered the swimming pool and someone responsible for that individual is deemed to be at least a threshold distance from the individual, then an alert may be raised.

Generally as described herein a process can obtain, gather, receive, retrieve, etc. signals from a collection of sensor devices that are installed in a swimming pool area. Example signals from the sensors are data values. The swimming pool area can include the swimming pool itself and a surrounding area (pool deck, patio, backyard, house, as examples). Based on the obtained signals, the process can ascertain that an individual has entered the swimming pool and identify characteristics of the individual. Characteristics may be general or specific, and may even uniquely identify the individual. Example characteristics include size, weight, and height of the individual, facial, and other features. Characteristics could also be correlated together to identify the individual, for instance based on facial recognition, voice recognition, proximity detection, or other means.

The process determines whether to raise an alert about the individual having entered the swimming pool. This determination can be based at least in part on location of individual(s) relative to the swimming pool area. The individuals may or may not be explicitly regarded as 'responsible' for the individual who entered the pool. An alert may be suppressed merely based on the number of other individuals detected in the pool area, even if none of them are regarded explicitly as being responsible for the individual who entered the pool. This may be made on the basis that adequate supervision of, or attention to, the individual who entered the pool is assumed since there are several other individuals present. The process performs actions, such as raising an alert or refraining from alerting, based on whether it was determined to raise an alert.

Embodiments of use cases are now provided by way of example only, and not limitation.

In a first example, water volume and weight thresholds are configured based on pool size and water depth. Water weight and volume sensor(s) may be triggered when one or more thresholds are exceeded. When the system is enabled, weight/volume sensor(s) are leveraged to detect whether there are any weight and/or volume changes in the swimming pool, and an alert is triggered based on notification configuration parameters. The system may be configured to send a text alert to phone(s) with a message such as URGENT SWIMMING POOL. Additionally or alternatively, the system may dial configured phone number(s) and provide a voice alert and/or trigger the home security alarm system to sound an alarm, for instance.

In another example, aspects utilize digital imaging analysis to compare/identify changes in the images. For instance, a camera can capture images and a computer system, either as part of the camera or in communication with the camera, can detect changes in the environment in order to alert based on configured notification parameters, such as text, voice, and/or home alarm parameters. An example change an object greater than a given threshold (e.g. of 2'×1') entering the pool. In this manner, one of the installed sensor devices of the system includes a camera that provides images on which image analysis is performed. The image analysis can detect image features, such as which individuals are present in the pool area and/or characteristics about them, such as age and identity. If there is an adult in the area, the system can refrain from alerting, for instance.

In yet another example, monocular vision-based and/or sonar-based sensors are leveraged to detect objects. Sonar imaging detectors can be mounted within the pool in secure containers. The sonar can perform real-time monitoring, for instance utilizing classical two-dimensional image processing techniques to determine whether an object is in the path of the sound pulse. Sound bounces off the object and returns an echo to the sonar transducer to indicate that an object was detected. Aspects can utilize sonar-based object detection to detect whether an object greater than a given parameter is in the pool, and trigger an alert based on configured notification parameters. Additionally a floor mat sensor, if installed, could detect pressure on the bottom surface of the pool, and a passive listening audio system, such as those offered by Google LLC and Amazon.com, Inc. could detect the presence of voices, which, as noted above, can inform a number of people in the pool area and approximate ages of those present, as well as potential distress calls from individuals in the area. Thus, voice detection performed on audio from an audio listening device may be able to uniquely identify an individual in the swimming pool area, which enables behavior based on whether a specific individual (e.g. parent or guardian) is detected in the area. Alerts can be suppressed when the responsible individual is close enough to the pool. Alternatively, an absolute alert could be raised whenever a child or other individuals of given characteristics, such as a child known to reside at the house, is detected. Additionally or alternatively, detecting a number of individuals in the swimming pool area can influence actions.

In a particular example, the voice detection identifies an individual, and the determining whether to raise the alert includes checking whether the uniquely identified individual is identified in the pre-configured parameters. An alert may or may not be raised depending on the outcome of this checking. Options such as suppressing the alert if a voice matches to someone specified in the parameters as a safe individual (e.g. household adult), raising the alert if the voice matches to that of a young child, and/or raising the alert if the person is identified but not specified in the parameters as a safe individual, are example outcomes.

Additionally or alternatively, embodiments can support proximity-based monitoring through observed usage patterns to reduce false positive alarms. The system could utilize a GPS module on an adult's smartwatch or other mobile device to ascertain, prior to raising an alert, that the adult is within a threshold proximity of the pool. A distance can be determined between the swimming pool area and an ascertained location of a responsible individual after detecting a pool entrance event (e.g. by unaccompanied child) but before raising the alert, and the system could determine to raise the alert to device(s) of the responsible individual and/or other individuals or devices if the distance exceeds a threshold specified by a parameter for alerting the responsible individual. By way of specific example, if the system detects a child has entered the pool, it can refrain from triggering a notification/alarm when an adult is supervising the child. However, if the system detects that all responsible individuals are located within the house when a child is detected in a pool, this could be considered ground for raising an alert on the basis that adequate supervision is not present.

Characteristics of an individual who entered a swimming pool can factor into the determination of whether to raise an alert. The characteristics can indicate that the individual is a child, for example. Pre-configured alert parameters can indicate parameter(s) for alerting responsible individual(s) preconfigured in the alert parameters. Specific examples are minimum distance before an alert is raised, and how to raise alerts. In case of a child entering the pool, and as described above, whether to raise an alert can include ascertaining a location of the responsible individual(s) of that child, as indicated in the parameters, and determining based on the ascertained location of the responsible individual whether to alert the responsible individual(s). As one alternative, the proximity determination could focus on whether there are any, or a threshold number of, adults in the area regardless of whether they are explicitly indicated as being responsible for the individual that entered the pool.

In some aspects, a self-learning aspect enables the system to learn over time when to raise notifications/alarms, and this self-learning is based upon processing performed in connection with previous alerting and non-alerting. If an alarm is dismissed as not relevant, this can train the system when to refrain from triggering similar alarms in the future, informing both when to raise an alarm and when not to raise an alarm. In this manner, feedback from prior incidents ('pool entrance events') in which a potential problem was observed but the alarm is disabled (e.g. by a user), or when the alarm was not disabled, can train the system to recognize whether observed potential problems are false positives, and when observed events are problems but were not recognized as such.

Thus, in particular examples, the determination of whether to raise the alert uses a cognitive model trained over time. The training can be based on detected swimming pool entrance events and associated characteristics of individuals that entered the swimming pool on those detected swimming events, and also on confirmations or rejections, by one or more users, that a respective alert is to be raised for each of detected swimming pool entrance events. user feedback to confirm or reject that an incident is truly one for which an alert is to be raised helps to train the cognitive model. The model can identify whether the raise the alert based at least in part on a comparison of the individual who entered the swimming pool on a given event to the individuals that entered the swimming pool on those prior-detected swimming events and on the confirmations or rejections for those prior events. Thus, in one example, the system detects the age/size of someone who enters the pool unaccompanied and decides whether to raise an alert/alarm based on how it has been trained to alert with respect to the size of the individuals entering the pool. Entrance of an unaccompanied older sibling into a pool may not trigger the raising of an alarm, while entrance by a younger child may trigger the raise of the alarm, on account of the size of the individuals in each case.

Figure 2:
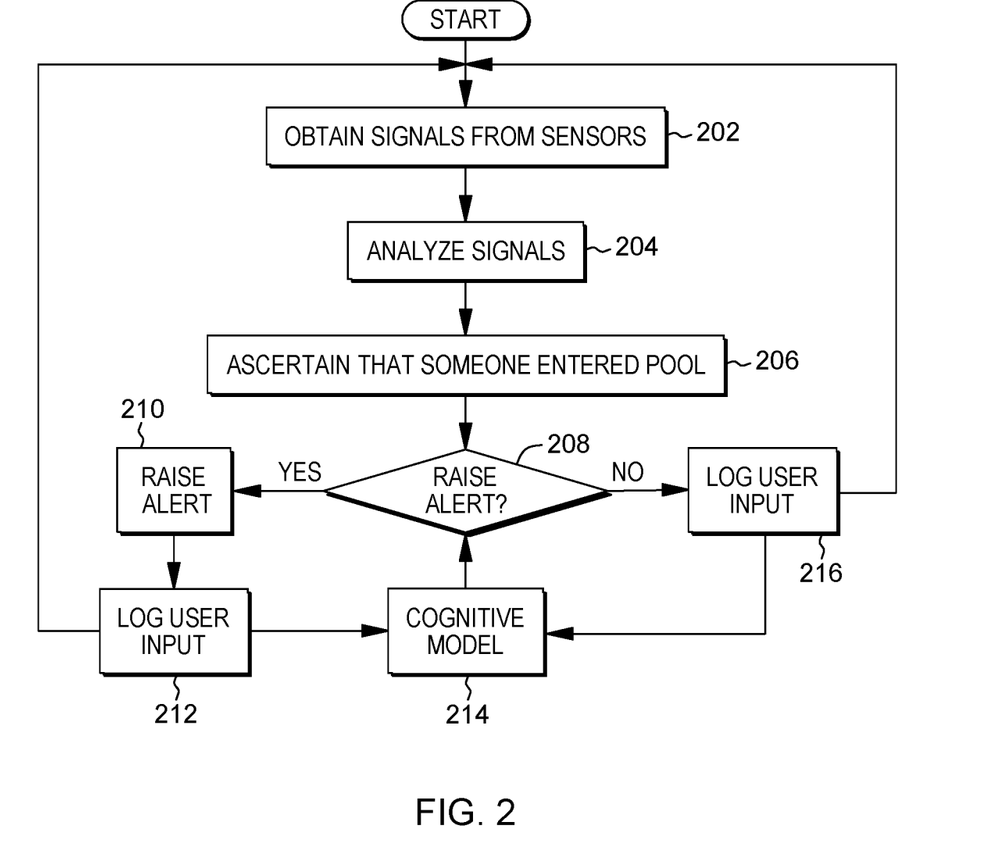
FIG. 2 depicts an example process for cognitive real-time detection and alerting for swimming pool safety, in accordance with aspects described herein.

FIG. 2 depicts an example process for cognitive real-time detection and alerting for swimming pool safety, in accordance with aspects described herein. In some examples, the process is performed by one or more computer systems, such as those described herein, which may include one or more computer systems of or connected to devices in a swimming pool area. Additionally or alternatively, processing can be performed by one or more cloud or remote computers that obtain data from sensors and other devices in an environment, such as an environment of FIG. 1, and one or more other computer systems, collectively or individually, located in the swimming pool area, proximate the swimming pool area, and/or remote from the swimming pool area.

The process begins by obtaining (202) signals from a plurality of sensor devices installed in a swimming pool area. The swimming pool area includes a swimming pool and can additionally include a surrounding area encompassing a pool deck, patio, and backyard area, as examples.

The sensor devices can include any appropriate devices for sensing or monitoring, such as sonar-based object detection device(s), water volume and weight sensor(s) installed in and/or around the pool, and audio listening device(s) that capture audio in the swimming pool area, as examples.

The process of FIG. 2 continues by analyzing (204) the obtained signals, for instance processing and interpreting the data, and ascertaining (206), based on the signals and the analysis, (i) that an individual has entered the swimming pool, and (ii) characteristics of the individual who has entered the swimming pool. Example characteristics that can be ascertained include size, weight, height, appearance, and demeanor of the individual. In some cases, this indicates that the individual who entered the swimming pool is a child. Additionally or alternatively, the characteristics can be correlated to a unique individual in order to identify that specific individual (e.g. through facial recognition, for instance).

The process then determines (208) whether to raise an alert about the individual having entered the swimming pool. The determination can be based at least in part on location of one or more other individuals relative to the swimming pool area, and on checking pre-configured parameters for alerting. Pre-configured parameters refers generally to a specification of rules and/or parameters for those rules to inform whether to raise alerts. As an example, the pre-configured parameters include a weekly day and time schedule when the swimming pool is deemed unusable, for instance the pool area is closed because it is after-hours, maintenance is being performed, or there are issues with the facilities. The determining in these instances can determine to raise the alert based at least in part on the checking identifying that, based on a current date and time and on the weekly date and time schedule, the swimming pool is unusable. Similarly, the pre-configured parameters can include a calendar-based schedule indicating holiday or seasonal-based availability of the swimming pool, and the determining determines to raise the alert based at least in part on the checking identifying that a current day is a holiday or is off-season. This can be particularly useful when the swimming pool is a public swimming pool and the schedule when the swimming pool is deemed unusable include dates and times when the swimming pool is closed to the public.

Returning to FIG. 2, processing is performed based on the determination about whether to raise an alert. The processing performed refers to whatever processing is performed by the computer system(s) performing the method after making the determination whether to raise the alert. If it is determined not to raise an alert, the processing could include re-entering the loop for the processing of FIG. 2, for instance by returning to 202. If it is determined at 208 to raise the alert (208, YES), the process of FIG. 2 proceeds by raising (210) the alert. In particular examples, raising the alert causes devices in or proximate to the swimming pool area to behave in desired ways. The raising could include signaling a home alarm system proximate the swimming pool area to set off a home alarm that includes an audible alarm, for instance.

After raising an alert, the process logs (212) any user input, for instance input that confirms that alarm was appropriate to raise, or input that dismisses the alarm. Similarly, the process can also log (216) user input if it was determined at 208 not to raise the alert (208, NO). The user input in this case could include input that confirms that it was appropriate not to raise the alert, or user input that indicates that an alert should have been raised based on the context in which it was determined not to raise the alert.

In any event, the process can feed the logged user input 212 and 216 into a cognitive model 214 for training purposes. The cognitive model 214 represents a model and engine to apply the model, which can serve as input to the determination (e.g., step 208) of whether to raise alerts, as depicted in FIG. 2. The cognitive model is trained over time based on (i) detected swimming pool entrance events and associated characteristics of individuals that entered the swimming pool on those detected swimming events, and (ii) on confirmations or rejections (e.g. the user input), by one or more users, that a respective alert is to be raised for each of detected swimming pool entrance events. The model can identify whether the raise an alert based at least in part on a comparison of the individual who entered the swimming pool to the individuals that entered the swimming pool on those detected swimming events and on the confirmations or rejections.

In some embodiments, the model and/or engine can be exposed as a service to customers who stream data from, e.g. the sensors in a pool area, to the service for analysis.

Figure 3:
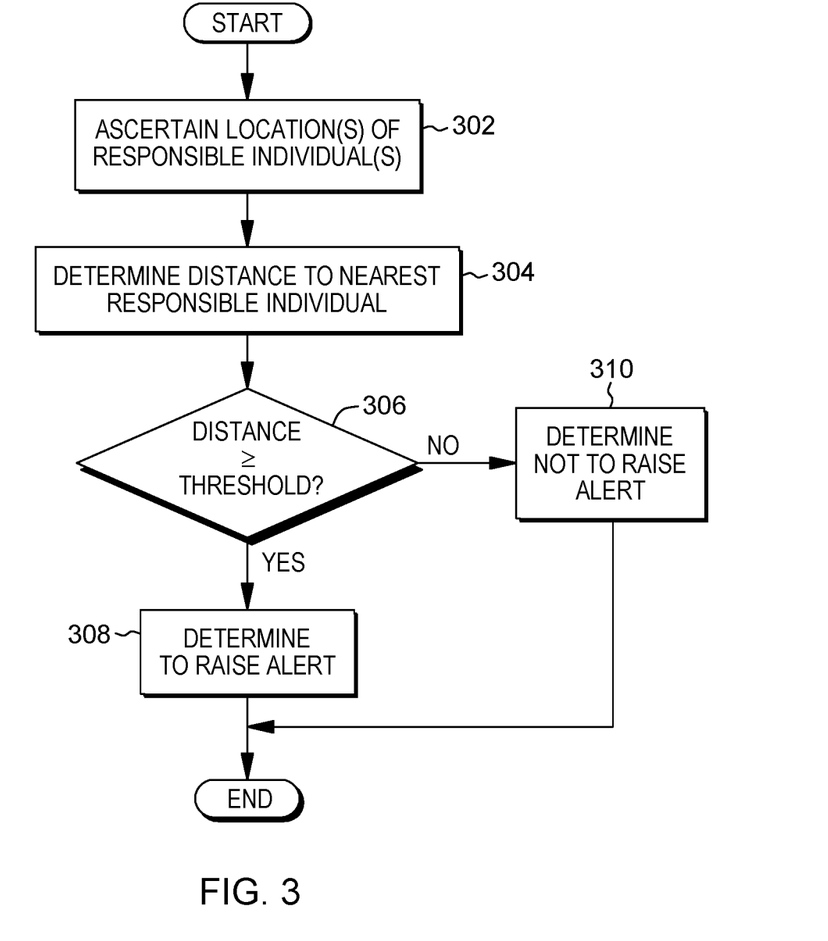
FIG. 3 depicts an example process for determining whether to raise an alert regarding a detected entrance into a swimming pool by an individual, in accordance with aspects described herein.

FIG. 3 depicts an example process for determining whether to raise an alert regarding a detected entrance into a swimming pool by an individual, in accordance with aspects described herein. The process can be performed by one or more computer systems. In this example, it is a child that entered the pool and the one or more other individuals (upon which the determination of whether to alert can be based) include a responsible individual, such as a parent, guardian, or babysitter, responsible for the child. The pre-configured parameters can indicate parameter(s) for alerting the responsible individual. Example parameters include a minimum threshold distance that must be present for an alert to be raised, and a specification of how to raise the alert, such as the devices on which to raise the alert and the types of alerts. The process includes ascertaining (302) a location of any responsible individual(s), and determining (304) the distance between the pool area and the nearest responsible individual. It can then be determined whether to alert the responsible individual or (raise any other desired alerts). If it is determined that the distance is greater than or equal to a configured threshold specified by parameter(s) for alerting (306, YES), then the process determines (308) to raise the alert. Otherwise (306, NO), the process determines (310) not to raise the alert. A special case when the ascertained location of the responsible individual is within the swimming pool area could result in determining not to raise the alert.

In some embodiments, one or more of the sensor devices includes camera(s) providing images as part of the obtained signals. The process (e.g. of FIG. 2) could further perform image analysis on the images, the image analysis detecting that the one or more other individuals are within the swimming pool area and detecting that at least one of the one or more other individuals is an adult. In this situation, the determining whether to raise the alert can determine not to raise the alert, based on the analysis indicating that the adult is within the swimming pool area.

Additionally or alternatively, the sensor device(s) can include audio listening device(s) that capture audio in the swimming pool area. The process could include performing voice detection to detect an identity uniquely identifying an individual (allowing, for instance, alerts to be raised when a specific individual, such as a parent, is not detected in the area) and/or a number of individuals in the swimming pool area (allowing, for instance, alerts to be avoided if a minimum number of adults are present).

In some examples, voice detection is leveraged to uniquely identify an individual in the pool area, and the determining whether to raise the alert includes checking whether the uniquely identified individual is identified in the pre-configured parameters. Performing processing can raise the alert, or not raise the alert, based on whether the uniquely identified individual is identified in the pre-configured parameters. This this enables options that include, as examples (i) suppressing/avoiding alerts if a voice matches to someone specified as a safe individual in the parameters (e.g. household adult); (ii) raising alerts if a detected voice matches to a young child; and/or (iii) raising alerts if the person is identified but not specified in the parameters as a safe individual.

Though many examples described here focus on triggering alerts after detecting that an individual has entered a swimming pool, aspects described herein are equally applicable to triggering alerts based on detecting presence of individuals within the swimming pool area generally, rather than after entering the pool per se. In other words, entrance of the individual into the pool need not be a prerequisite for the alerting, if, for safety or other reasons, presence in the area by the individual is to potentially raise desired alerts.

Although various examples are provided, variations are possible without departing from a spirit of the claimed aspects.

Figure 4:
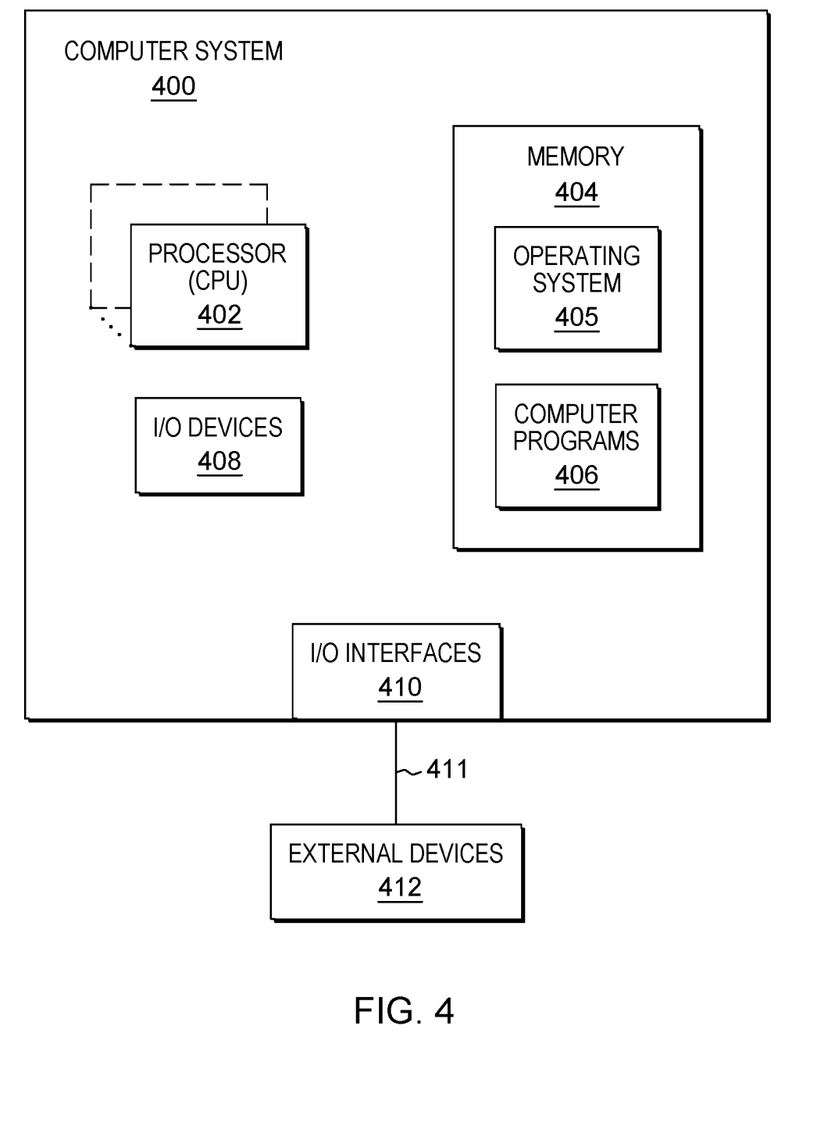
FIG. 4 depicts one example of a computer system and associated devices to incorporate and/or use aspects described herein.

Processes described herein may be performed singly or collectively by one or more computer systems, such as one or more computer systems including sensor devices, smart devices, home gateways, routers, cloud servers, mobile devices, or a combination of the foregoing, as examples. FIG. 4 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, N.Y., USA), Intel Corporation (Santa Clara, Calif., USA) or ARM Holdings plc (Cambridge, England, United Kingdom), as examples.

FIG. 4 shows a computer system 400 in communication with external device(s) 412. Computer system 400 includes one or more processor(s) 402, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 402 can also include register(s) to be used by one or more of the functional components. Computer system 400 also includes memory 404, input/output (I/O) devices 408, and I/O interfaces 410, which may be coupled to processor(s) 402 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 404 can be or include main or system memory (e.g. Random Access Memory) used in the execution of program instructions, storage device(s) such as hard drive(s), flash media, or optical media as examples, and/or cache memory, as examples. Memory 404 can include, for instance, a cache, such as a shared cache, which may be coupled to local caches (examples include L1 cache, L2 cache, etc.) of processor(s) 402. Additionally, memory 404 may be or include at least one computer program product having a set (e.g., at least one) of program modules, instructions, code or the like that is/are configured to carry out functions of embodiments described herein when executed by one or more processors.

Memory 404 can store an operating system 405 and other computer programs 406, such as one or more computer programs/applications that execute to perform aspects described herein. Specifically, programs/applications can include computer readable program instructions that may be configured to carry out functions of embodiments of aspects described herein.

Examples of I/O devices 408 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (412) coupled to the computer system through one or more I/O interfaces 410.

Computer system 400 may communicate with one or more external devices 412 via one or more I/O interfaces 410. Example external devices include a keyboard, a pointing device, a display, and/or any other devices that enable a user to interact with computer system 400. Other example external devices include any device that enables computer system 400 to communicate with one or more other computing systems or peripheral devices such as a printer. A network interface/adapter is an example I/O interface that enables computer system 400 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Wash., U.S.A.).

The communication between I/O interfaces 410 and external devices 412 can occur across wired and/or wireless communications link(s) 411, such as Ethernet-based wired or wireless connections. Example wireless connections include cellular, Wi-Fi, Bluetooth®, proximity-based, near-field, or other types of wireless connections. More generally, communications link(s) 411 may be any appropriate wireless and/or wired communication link(s) for communicating data.

Particular external device(s) 412 may include one or more data storage devices, which may store one or more programs, one or more computer readable program instructions, and/or data, etc. Computer system 400 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 400 may be operational with numerous other general purpose or special purpose computing system environments or configurations. Computer system 400 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
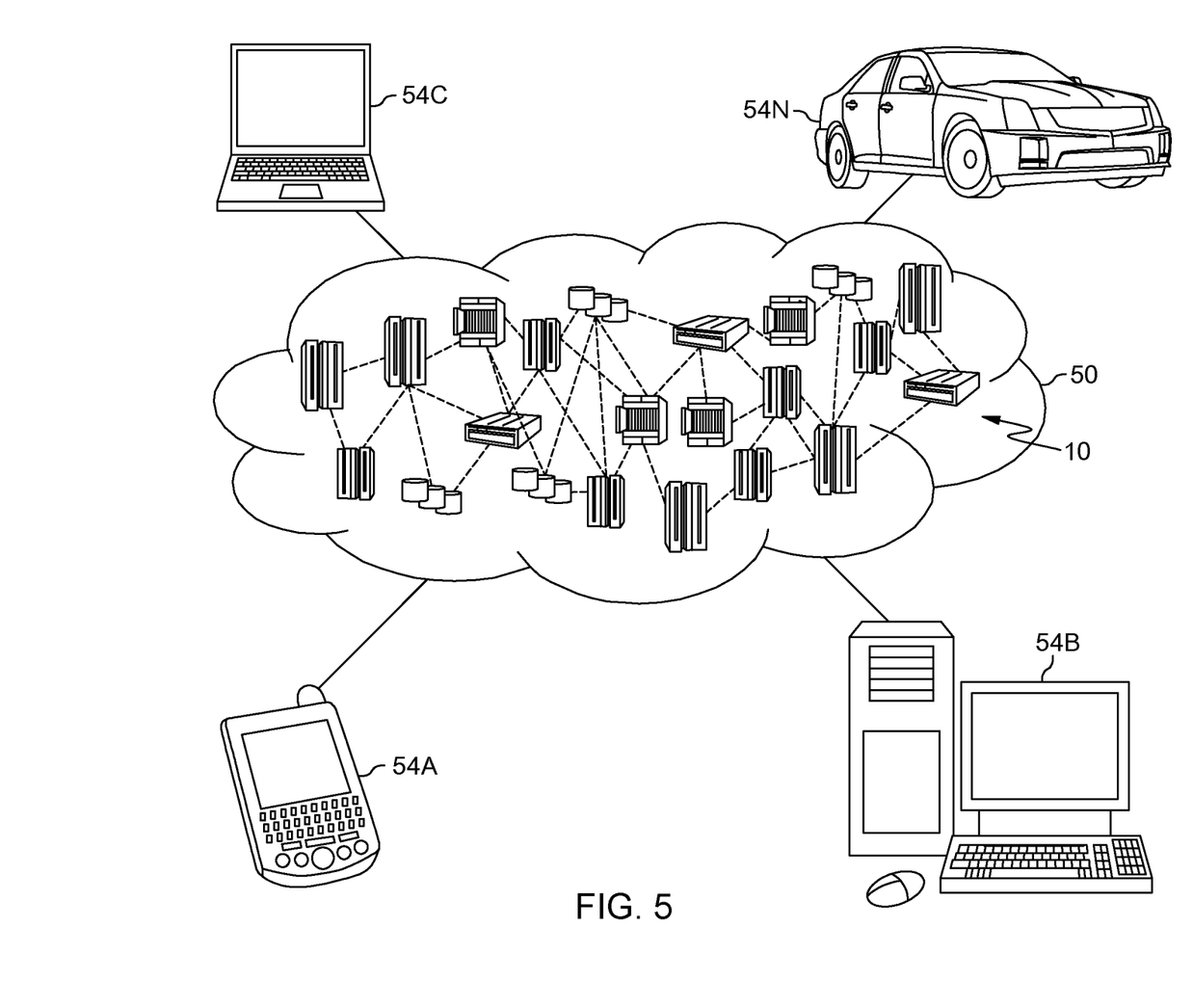
FIG. 5 depicts a cloud computing environment according to an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
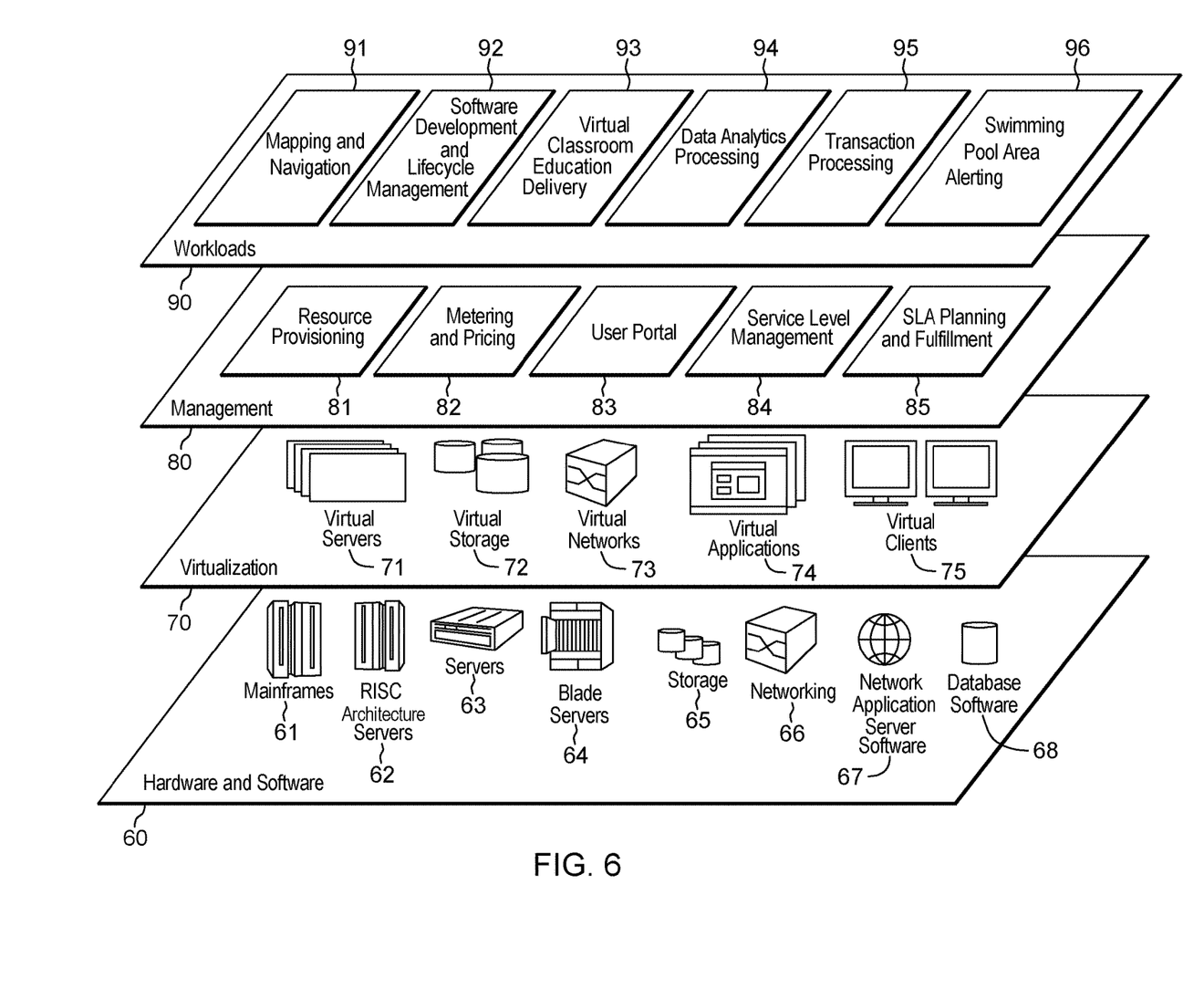
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and swimming pool area alerting 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
obtaining signals from a plurality of sensor devices installed in a swimming pool area, the swimming pool area comprising a swimming pool;
ascertaining, based on the obtained signals, that an individual has entered the swimming pool and identifying, based on the obtained signals, characteristics of the individual who has entered the swimming pool;
determining whether to raise an alert about the individual having entered the swimming pool, the determining whether to raise the alert comprising:
determining a location of an other individual relative to the swimming pool area, and obtaining therefrom an indication of whether the other individual is within the swimming pool area; and
checking pre-configured parameters for alerting, wherein the determining whether to raise the alert is based on whether the other individual is within the swimming pool area and on the checking the pre-configured parameters for alerting; and
performing processing based on the determining whether to raise an alert.

2. The method of claim 1, wherein the determined characteristics of the individual who entered the swimming pool indicate that the individual who entered the swimming pool is a child, wherein the other individual is a responsible individual responsible for the child, wherein the pre-configured parameters indicate one or more parameters for alerting the responsible individual, and wherein the determining whether to raise an alert about the child having entered the swimming pool comprises:
determining based on the determined location of the responsible individual whether to alert the responsible individual.

3. The method of claim 2, wherein the determining the location of the responsible individual relative to the swimming pool area indicates that the responsible individual is not in the swimming pool area, and wherein the determining whether to alert the responsible individual comprises:
determining a distance between the swimming pool area and the determined location of the responsible individual; and
determining whether the distance between the swimming pool area and the determined location of the responsible individual exceeds a threshold specified by the one or more parameters for alerting the responsible individual; and
wherein the performing processing comprises alerting the responsible individual based on the distance exceeding the threshold.

4. The method of claim 2, wherein the determined location of the responsible individual is within the swimming pool area, wherein the determining the distance between the swimming pool area and the determined location of the responsible individual determines that the responsible individual is located in the swimming pool area, and wherein the determining whether to raise the alert determines not to raise the alert on a basis of the responsible individual being located in the swimming pool area.

5. The method of claim 1, wherein the pre-configured parameters comprise a weekly day and time schedule when the swimming pool is deemed unusable, wherein the determining determines to raise the alert based at least in part on the checking identifying, based on a current date and time and on the weekly date and time schedule, that the swimming pool is unusable.

6. The method of claim 5, wherein the swimming pool is a public swimming pool and the weekly date and time schedule when the swimming pool is deemed unusable comprises dates and times when the swimming pool is closed to the public.

7. The method of claim 5, wherein the pre-configured parameters further comprise a calendar-based schedule indicating holiday or seasonal-based availability of the swimming pool, wherein the determining determines to raise the alert based at least in part on the checking identifying that a current day is a holiday or is off-season.

8. The method of claim 1, wherein a sensor device of the plurality of sensor devices comprises a camera providing images as part of the obtained signals, wherein the method further comprises performing image analysis on the images, the image analysis detecting that the other individuals is within the swimming pool area indicating that the other individual is within the swimming pool area, and wherein the determining whether to raise the alert determines not to raise the alert based on the analysis indicating that the other individual is within the swimming pool area.

9. The method of claim 1, wherein a sensor device of the plurality of sensor devices comprises an audio listening device capturing audio in the swimming pool area, wherein the method further comprises performing voice detection to detect at least one selected from the group consisting of: (i) an identity uniquely identifying the other individual in the swimming pool area, and (ii) a number of individuals, of which the other individual is a part, in the swimming pool area.

10. The method of claim 9, wherein the voice detection uniquely identifies the other individual, and wherein the determining whether to raise the alert comprises checking whether the uniquely identified other individual is identified in the pre-configured parameters, wherein the performing processing raises the alert or does not raise the alert, based on whether the uniquely identified other individual is identified in the pre-configured parameters.

11. The method of claim 1, wherein the plurality of sensor devices comprises a sonar-based object detection device, at least one selected from the group consisting of a water volume sensor and weight sensor installed in the swimming pool, and an audio listening device capturing audio in the swimming pool area.

12. The method of claim 1, wherein the determining whether to raise an alert determines to raise the alert, and wherein the performing processing comprises raising the alert, the raising comprising signaling a home alarm system proximate the swimming pool area to set off a home alarm, the home alarm comprising an audible alarm.

13. The method of claim 1, wherein the determining whether to raise the alert uses a cognitive model trained over time based on (i) detected swimming pool entrance events and associated characteristics of individuals that entered the swimming pool on those detected swimming events, and (ii) on confirmations or rejections, by one or more users, that a respective alert is to be raised for each of detected swimming pool entrance events, wherein the model identifies whether to raise the alert based at least in part on a comparison of the individual who entered the swimming pool to the individuals that entered the swimming pool on those detected swimming events and on the confirmations or rejections.

14. A computer system comprising: a memory; and a processor in communication with the memory, wherein the computer system is configured to perform a method comprising:
obtaining signals from a plurality of sensor devices installed in a swimming pool area, the swimming pool area comprising a swimming pool;
ascertaining, based on the obtained signals, that an individual has entered the swimming pool and identifying, based on the obtained signals, characteristics of the individual who has entered the swimming pool;
determining whether to raise an alert about the individual having entered the swimming pool, the determining whether to raise the alert comprising:
determining a location of an other individual relative to the swimming pool area, and obtaining therefrom an indication of whether the other individual is within the swimming pool area; and
checking pre-configured parameters for alerting, wherein the determining whether to raise the alert is based on whether the other individual is within the swimming pool area and on the checking the pre-configured parameters for alerting; and
performing processing based on the determining whether to raise an alert.

15. The computer system of claim 14, wherein:
the determined characteristics of the individual who entered the swimming pool indicate that the individual who entered the swimming pool is a child;
the other individual is a responsible individual responsible for the child;
the pre-configured parameters indicate one or more parameters for alerting the responsible individual;
the determining whether to raise an alert about the child having entered the swimming pool comprises:
determining based on the determined location of the responsible individual whether to alert the responsible individual, wherein the determining the location of the responsible individual relative to the swimming pool area indicates that the responsible individual is not in the swimming pool area, and wherein the determining whether to alert the responsible individual comprises:
determining a distance between the swimming pool area and the determined location of the responsible individual; and
determining whether the distance between the swimming pool area and the determined location of the responsible individual exceeds a threshold specified by the one or more parameters for alerting the responsible individual; and
the performing processing comprises alerting the responsible individual based on the distance exceeding the threshold.

16. The computer system of claim 14, wherein a sensor device of the plurality of sensor devices comprises an audio listening device capturing audio in the swimming pool area, wherein the method further comprises performing voice detection to detect an identity uniquely identifying the other individual in the swimming pool area, wherein the determining whether to raise the alert comprises checking whether the uniquely identified other individual is identified in the pre-configured parameters, and wherein the performing processing raises the alert or does not raise the alert, based on whether the uniquely identified other individual is identified in the pre-configured parameters.

17. The computer system of claim 14, wherein the determining whether to raise an alert determines to raise the alert, and wherein the performing processing comprises raising the alert, the raising comprising signaling a home alarm system proximate the swimming pool area to set off a home alarm, the home alarm comprising an audible alarm.

18. The computer system of claim 14, wherein the determining whether to raise the alert uses a cognitive model trained over time based on (i) detected swimming pool entrance events and associated characteristics of individuals that entered the swimming pool on those detected swimming events, and (ii) on confirmations or rejections, by one or more users, that a respective alert is to be raised for each of detected swimming pool entrance events, wherein the model identifies whether to raise the alert based at least in part on a comparison of the individual who entered the swimming pool to the individuals that entered the swimming pool on those detected swimming events and on the confirmations or rejections.

19. A computer program product comprising:
 a computer readable storage medium readable by a processing circuit and storing instructions for execution by the processing circuit for performing a method comprising:
 obtaining signals from a plurality of sensor devices installed in a swimming pool area, the swimming pool area comprising a swimming pool;
 ascertaining, based on the obtained signals, that an individual has entered the swimming pool and identifying, based on the obtained signals, characteristics of the individual who has entered the swimming pool;
 determining whether to raise an alert about the individual having entered the swimming pool, the determining whether to raise the alert comprising:
 determining a location of an other individual relative to the swimming pool area, and obtaining therefrom an indication of whether the other individual is within the swimming pool area; and
 checking pre-configured parameters for alerting, wherein the determining whether to raise the alert is based on whether the other individual is within the swimming pool are and the checking the pre-configured parameters for alerting; and
 performing processing based on the determining whether to raise an alert.

20. The computer program product of claim 19, wherein:
 the determined characteristics of the individual who entered the swimming pool indicate that the individual who entered the swimming pool is a child;
 the other individual is a responsible individual responsible for the child;
 the pre-configured parameters indicate one or more parameters for alerting the responsible individual;
 the determining whether to raise an alert about the child having entered the swimming pool comprises:
 determining based on the determined location of the responsible individual whether to alert the responsible individual, wherein the determining the location of the responsible individual relative to the swimming pool area indicates that the responsible individual is not in the swimming pool area, and wherein the determining whether to alert the responsible individual comprises:
 determining a distance between the swimming pool area and the determined location of the responsible individual; and
 determining whether the distance between the swimming pool area and the determined location of the responsible individual exceeds a threshold specified by the one or more parameters for alerting the responsible individual; and
 the performing processing comprises alerting the responsible individual based on the distance exceeding the threshold by raising the alert, the raising comprising signaling a home alarm system proximate the swimming pool area to set off a home alarm, the home alarm comprising an audible alarm.

\* \* \* \* \*